United States Patent
Lee (12) 
(10) Patent No.: US 6,392,632 B1
(45) Date of Patent: May 21, 2002

(54) OPTICAL MOUSE HAVING AN INTEGRATED CAMERA

(75) Inventor: Wen-Chieh Geoffrey Lee, Hsinchu (TW)

(73) Assignee: Windbond Electronics, Corp., Taiwan ( * ) Notice: Subject to any disclaimer, the term of this patent is extended or adjusted under 35 U.S.C. 154(b) by 0 days.

(21) Appl. No.: 09/207,425

(22) Filed: Dec. 8, 1998

(51) Int. Cl.⁷ .................................. G09G 5/08
(52) U.S. Cl. ................ 345/158; 345/156; 345/163; 345/166; 382/313; 382/314
(58) Field of Search .................. 345/158, 163, 345/166, 156; 382/313, 314

(56) References Cited

U.S. PATENT DOCUMENTS

| | | | | |
|---|---|---|---|---|
| 5,355,146 A | * | 10/1994 | Chiu et al. | 345/156 |
| 5,656,804 A | * | 8/1997 | Barken et al. | 235/472 |
| 5,909,209 A | * | 6/1999 | Dickinson | 345/166 |
| 5,953,686 A | * | 9/1999 | Piernot et al. | 345/158 |
| 5,994,710 A | * | 11/1999 | Knee et al. | 345/158 |
| 5,703,623 A | * | 12/1999 | Hall et al. | 345/158 |
| 5,999,169 A | * | 12/1999 | Lee | 345/163 |
| 6,172,354 B1 | * | 1/2001 | Aden et al. | 345/156 |
| 6,256,016 B1 | * | 7/2001 | Piot et al. | 345/166 |

OTHER PUBLICATIONS

Logitech Marble Mouse Internet Materials.

* cited by examiner

*Primary Examiner*—Richard Hjerpe
*Assistant Examiner*—Ali Zamani
(74) *Attorney, Agent, or Firm*—Raymond Sun

(57) ABSTRACT

The present invention provides an apparatus for capturing images and for manipulating a cursor. The apparatus can be used for operation in a first mode and a second mode. The apparatus includes an opto-electronic mechanism that is provided for receiving image signals. The apparatus also has a user-selectable trigger that allows a user to assert or de-assert a mode signal that determines whether operation is desired in the first mode or the second mode. The apparatus has a controller that is coupled to the opto-electronic mechanism and user-selectable trigger for receiving the mode signal. When operation is in the first mode, the received image signals are processed and used to control movement of a cursor on a screen or display. When operation is in the second mode, the received image signals are processed and displayed as video images on a PC.

22 Claims, 4 Drawing Sheets

OPTICAL MOUSE HAVING AN INTEGRATED CAMERA

BACKGROUND OF THE INVENTION

1. Field of the Invention

The present invention relates generally to cursor control devices, and in particular, to an optical mouse having an integrated camera. The optical mouse with integrated camera can also be implemented with a notebook computer.

2. Background Art

To a personal computer (PC) user, the mouse is one of the basic devices utilized to input data into the PC, the other being the keyboard. Computer mice are often referred to as cursor positioning devices or cursor control devices, although mice are utilized to perform many other functions, such as to launch applications, re-size and move windows, drag, open and drop documents, select icons, text, menu items in a pull-down menu, and others. Unfortunately, the conventional computer mouse has several shortcomings.

First, prior art mice employ a rolling ball mechanism that is bulky. For example, for applications where space is a premium (e.g., lap-top computers), mice cannot be used effectively, and other cursor control devices, such as trackballs or touchpads, are preferred. Second, this ball mechanism wears out through use, and users often notice a degradation of mouse action and precision after extended use. In this regard, PC users have resigned themselves to the fact that when the ball mechanism is worn, they need to replace the worn mouse with a new mouse incurring undesirable hassle and costs. Third, even when the ball mechanism is not worn, the resolution and sensitivity of the conventional mouse is tolerable, but can be improved.

Recently, Logitech Corp. introduced a cursor control device marketed under the trademark "MARBLE". This device uses a trackball that is printed with a random pattern of dots. When the ball is moved, a light beam illuminates a small section of dots, and the image of this section is passed through a lens and reflected off a mirror. The reflected image is read by a sensor chip that calculates the movement of the dots. Unfortunately, this device requires a unique trackball having a special pattern of dots to feed the motion data to the sensor chip. Therefore, many of the above-mentioned drawbacks are still not resolved by this device.

In recent years, the advancement of complementary metal oxide semiconductor (CMOS) image sensor technologies has paved a way for the digital camera, video digital camera, and the PC camera to become the next low-cost peripheral device for the PC. For example, users can now use a PC camera and communication software (e.g., Microsoft's free software, Net-Meeting) to send and receive live video images to and from a remote PC through a telephone line or local area network (LAN).

Unfortunately, despite these advances in image sensor technologies, an average PC user is not ready to accept the PC camera except for in limited uses, such as in security surveillance systems. An unresolved challenge to the PC industry is how to make the PC camera more useful and accepted by the average PC user.

Accordingly, there remains a need for an improved cursor control device that overcomes the disadvantages set forth previously.

SUMMARY OF THE INVENTION

It is an object of the present invention to provide a cursor control device that does not require a rolling ball mechanism, and that is compact, cost-effective to manufacture, and immune to the wear that a rolling ball mechanism is susceptible to.

It is another object of the present invention to provide an optical cursor control device that uses captured images to detect motion of the cursor control device, thereby improving the resolution and sensitivity of the cursor control device.

It is another object of the present invention to provide a cursor control device that can include an integrated camera.

In order to accomplish the objects of the present invention, an apparatus is provided that captures images that are used to manipulate a cursor. The apparatus includes an opto-electronic mechanism that is provided for receiving image signals. The received image signals are processed using digital signal processing (DSP) techniques and used to control movement of a cursor on a screen or display. In one embodiment, the DSP includes motion estimation.

The apparatus can be also be used for operation in two modes. In this embodiment, the apparatus also has a user-selectable trigger that allows a user to assert or de-assert a mode signal that determines whether operation is desired in a first mode or a second mode. The apparatus has a controller that is coupled to the opto-electronic mechanism and user-selectable trigger for receiving the mode signal. When operation is in the first mode, the received image signals are processed using DSP, and used to control movement of a cursor on a screen or display. When operation is in the second mode, the received image signals are processed and displayed as video images on a PC.

In one embodiment of the present invention, the apparatus can be a stand-alone device (such as a mouse) that is coupled to a personal computer. In another embodiment of the present invention, the apparatus can be integrated into the housing of a notebook computer for use therewith.

Thus, the apparatus of the present invention provides a single mechanism that has at least two different uses: to control cursor movement, and to capture video images. When used as a cursor control device, the apparatus of the present invention does not require a rolling ball mechanism, and is compact, cost-effective to manufacture, and immune to the wear that a rolling ball mechanism is susceptible to. In addition, the use of captured images and DSP to detect motion of the cursor control device improves the resolution and sensitivity of the cursor control device. When used as a camera, the apparatus of the present invention saves desktop space while providing a PC user with increased availability and visibility of digital image capture devices, as well as increased number of applications for and usefulness of the digital image capture devices.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known or conventional data processing techniques, hardware devices and circuits are omitted so as to not obscure the description of the present invention with unnecessary detail.

The cursor control device of the present invention utilizes an integrated opto-electronic mechanism that is used to capture images that are used primarily to control a cursor. The captured images can also be used, in one embodiment, as video data that is processed and subsequently provided to a display for displaying video or camera images. The cursor control device of the present invention can be provided as a separate stand-alone device, or can be integrated into a notebook computer for use therewith.

Figure 1A:
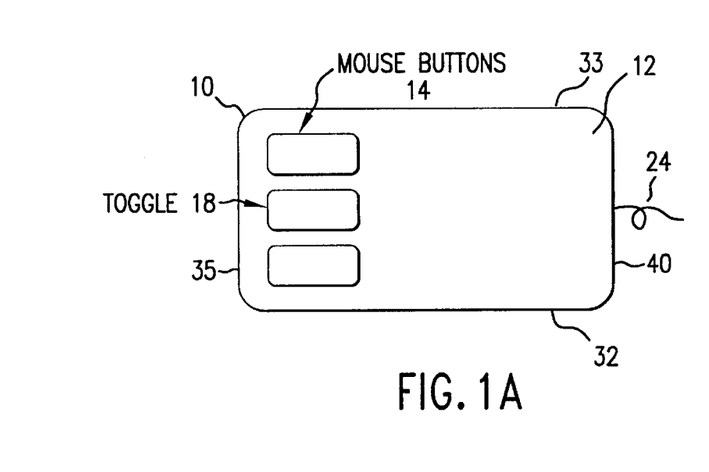
FIG. 1A–1D illustrate various views of a cursor control device configured in accordance with one embodiment of the present invention.
Figure 1B:
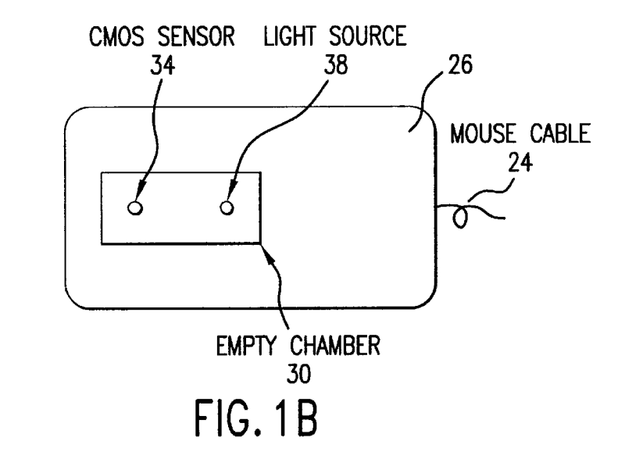
Figure 1C:
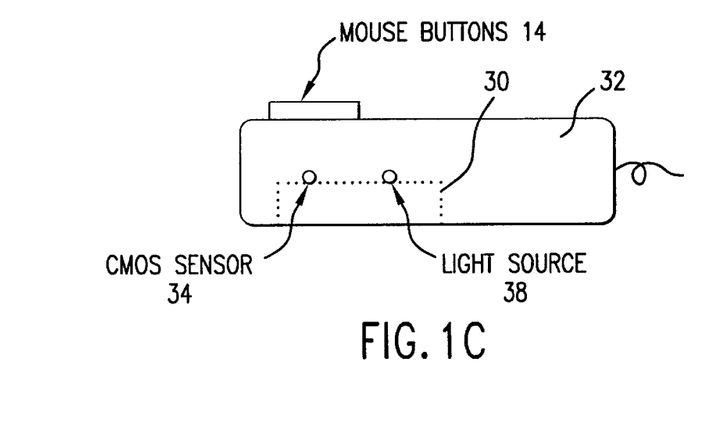
Figure 1D:
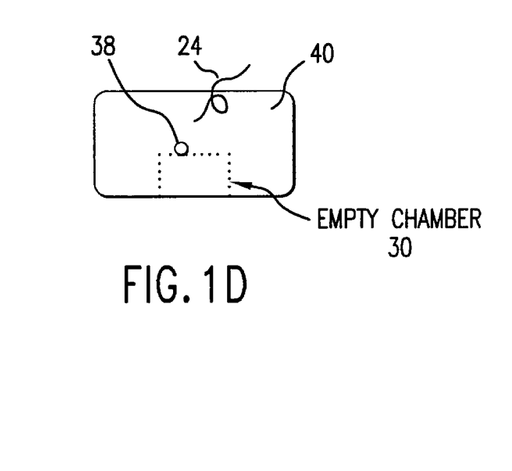

FIG. 1A–1D illustrate various views of a cursor control device 10 configured in accordance with one non-limiting embodiment of the present invention. In this embodiment, cursor control device 10 is a stand-alone mouse. FIG. 1A illustrates a top plan view of cursor control device 10. FIGS. 1B, 1C and 1D are the bottom plan view, left side cross-sectional view, and rear cross-sectional view, respectively, of cursor control device 10.

Cursor control device 10 has a housing that includes a top surface 12, a left side surface 32, a right side surface 33, a front surface 35 and a rear surface 40. A plurality of mouse buttons 14 is provided on the top surface 12. The mouse buttons 14 include a toggle button 18 that is related to and dedicated for use in the present invention. The toggle button 18 is preferably the middle mouse button, but can also be either the right button or the left button as long as the button is dedicated for use in the present invention and not used by the cursor control device 10 for another function. Alternatively, toggle button 18 can be implemented with one or more special keyboard keys (e.g., F12, or CTRL+v, etc.).

The toggle button 18 is user-selectable in that button 18 can be activated by a user as a triggering mechanism to generate a mode signal to a personal computer (PC) 78 (see FIGS. 2A and 2B below) or an on-board controller 118 (see FIG. 3 below) to inform the PC 78 or controller 118 of the user-desired mode of operation. Specifically, the cursor control device 10 can be used for two modes of operation: a cursor positioning mode (cursor control mode) and an image capture mode (camera mode), which are described hereinafter in greater detail. Cursor control device 10 also includes a cable 24 extending from the rear surface 40 that can be coupled to the PC 78 to communicate information to the PC 78.

Cursor control device 10 includes a light sensor 34 (also referred to herein as an opto-electronic mechanism) which is can be a transducer that converts light into a corresponding electrical signal by the well-known photo-electric effect. Light sensor 34 can be a charge-coupled device (CCD) or a complementary metal oxide semiconductor (CMOS) device. Light sensor 34 is coupled to electronics, which will be described in greater detail hereinafter with reference to FIG. 3, that process the received information.

Some advanced embodiments of the light sensor 34 (such as certain CMOS devices) can also include integrated Digital Signal Processing (DSP) logic to perform simple DSP tasks on the received image signals so that the images can be stored, displayed or otherwise manipulated by a PC. If such an advanced sensor 34 is used, then DSP may not need to be performed by the PC 78 or the controller 118 described below, and the toggle signal will need to be coupled to sensor 34.

The housing of cursor control device 10 also includes a bottom surface 26 for contacting a flat surface, hereinafter referred to as a contact surface (e.g., a mouse pad or top surface of a table). Bottom surface 26 defines a chamber 30 having an opening. Chamber 30 includes a ceiling wherein sensor 34 is disposed. Chamber 30 is provided to raise sensor 34 from the contact surface (i.e., separate sensor 34 from the contact surface with a minimum distance). This minimum distance is important when the device 10 is used in a cursor control mode, which is described in greater detail hereinafter.

Cursor control device 10 also includes a light source 38 for providing illumination to aid the light sensor 34 in detecting image information when in the cursor control mode, as described in greater detail hereinafter with reference to FIG. 2B. Light source 38 can be implemented with a light-emitting diode (LED).

Rear surface 40 has an opening for the cable 24 to extend therethrough. In one embodiment, the rear surface 40 is generally flat so that cursor control device 10 can stand on and be balanced in a relatively secure manner on the contact surface. In other words, the rear surface 40 is relatively planar so that cursor control device 10 can be disposed on a flat contact surface and stand upright without additional support. Alternatively, the rear surface 40 does not need to be flat, but in this case, a support (such as a rack, a saddle, or a hinged leg attached to the housing of the cursor control device 10) may need to be provided to stand the cursor control device 10 upright.

Figure 2A:
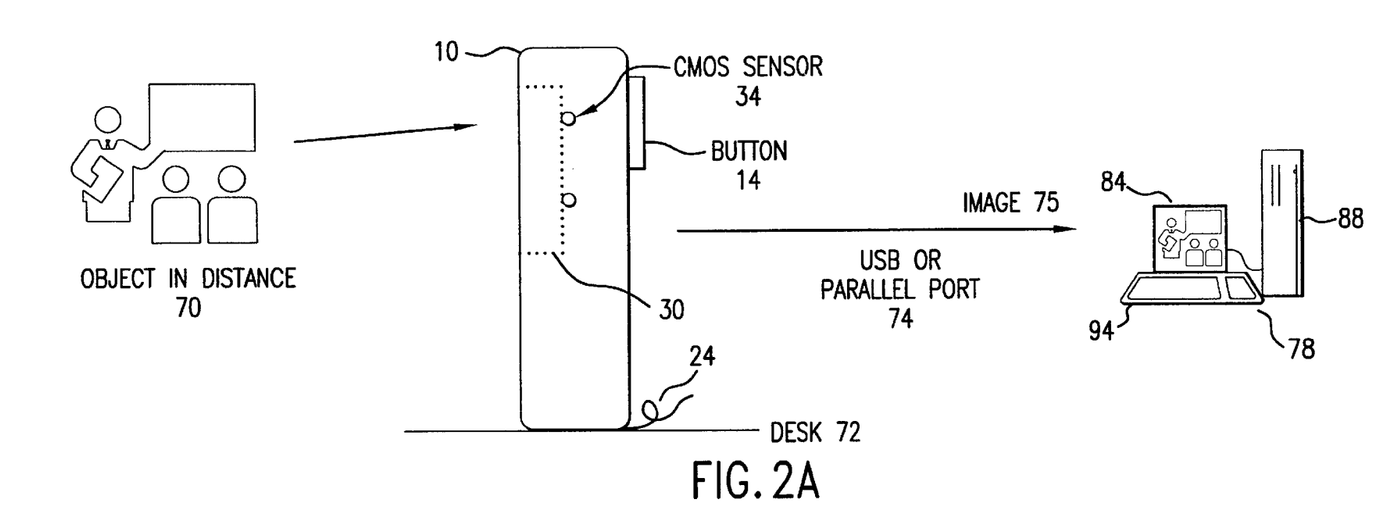
FIG. 2A illustrates how the cursor control device configured in accordance with one embodiment of the present invention provides captured images to a PC.

FIG. 2A illustrates how the cursor control device of FIGS. 1A–1D can be used to provide captured images to a PC 78. PC 78 can include a display 84 that can be utilized to display captured images 75, a keyboard 94 for receiving user input, and a chassis or computer case 88 for housing the electronics and computer hardware.

First, a user positions cursor control device 10 so that sensor 34 is in a line-of-sight orientation with respect to an object 70 to be captured. As mentioned previously, cursor control device 10 can stand upright, with or without additional support on its rear surface 40 (i.e., surface 40 can serve as a base surface that contacts and sits on a flat contact surface such as a desk 72). Another surface of cursor control device 10, such as the left surface 32 or the right surface 33, can also serve as a base surface to contact desk 72 as long as the left and right surfaces 32, 33 are relatively planar, or are provided with the necessary support(s).

Alternatively, a user can hold cursor control device 10 in his or her hand and aim the cursor control device 10 at object 70 as one would hold and aim a camera.

Next, the toggle button 18 can be selected by the user to indicate to the PC 78 or controller 118 that the cursor control device 10 is to operate in a camera mode. Alternatively, toggle button 18 can be selected by the user before the user positions the cursor control device 10 for image capture. The cursor control device 10 then captures continuing images 75 of an object, such as object 70, and provides the images 75 to PC 78 through cable 24. PC 78 includes a port 74 for coupling cable 24. In this example, the port 74 can be any port, including but not limited to a Universal Serial Port (USB) or a parallel port, or ports utilizing an IEEE 1394 standard (which is popular in Japan). Either the cursor control device 10 (through a controller 118 having embedded DSP functions, as explained below) or the PC 78 will then perform digital signal processing (DSP) on the received images for subsequent display on display 84.

Figure 2B:
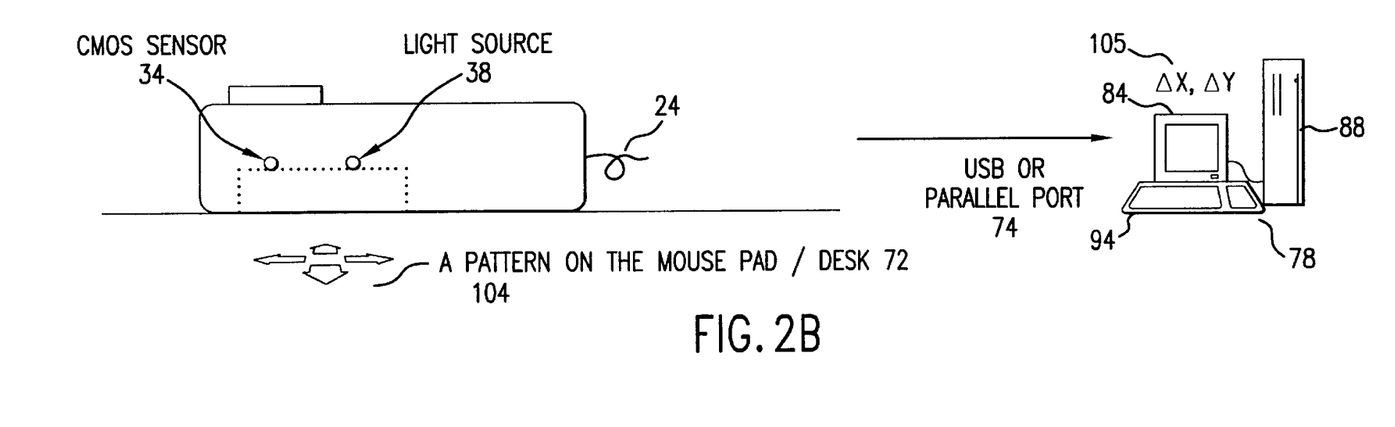
FIG. 2B illustrates how the cursor control device of FIG. 2A utilizes captured images to provide position signals to a PC.

FIG. 2B illustrates how the cursor control device 10 of FIG. 2A utilizes captured images to provide position signals 105 (delta(x), delta(y)) to the PC 78. Again, the toggle button 18 can be selected by the user at the end of use in the camera mode, so that a mode signal will be provided to inform the PC 78 or controller 118 that cursor control device 10 is ready for use in a cursor control mode. Cursor control device 10 then utilizes received image signals for DSP, but in this case, to perform motion estimation of cursor control device 10. In this case, motion estimation is a type of DSP and refers to detecting positional displacement of the cursor control device 10 and providing signals that indicate the displacement. PC 78 receives these position signals and uses the signals to move the cursor on display 84 in a manner consistent with the displacement of cursor control device 10. An example of motion estimation is described in greater detail hereinafter with reference to FIG. 4.

When cursor control device 10 is being used in a cursor control mode, cursor control device 10 can be positioned so that sensor 34 faces a contact surface, such as a mouse pad or desk 72. When the bottom surface 26 of device 10 rests on the contact surface, chamber 30 is not adequately lit. Therefore, the light source 38 is actuated in the cursor control mode to provide sufficient illumination in chamber 30 so that image information can be detected from the contact surface. The illumination creates light rays that are reflected from the contact surface to be received by the sensor 34.

When the device 10 is used with the sensor 34 facing a contact surface, it is important for contact surface to have a reference or orientation point so that movement (motion estimation) of device 10 can be determined with respect to the reference point. The reference point can be a pattern 104, or any image, such as a cover of a magazine. The image need not be complex, and can even be a dot or a line.

It is not necessary that the sensor 34 face a contact surface when used in the cursor control mode. As an example, the sensor 34 can be positioned to face a remote image (such as a wall or a projection screen) during a presentation. In this example, the device 10 can be coupled to, or integrated with (such as explained in connection with FIGS. 5–10 below), a notebook computer that is coupled to a TFT projector and running the Powerpoint™ application to present images (such as slides) during a presentation. A user can then use a laser pointer as an extended cursor control device by moving the laser beam on the wall or projection screen. The sensor 34 will detect the movement of the laser beam and process the motion of the laser beam to control the cursor of the projected images on the wall or screen.

In summary, the sensor 34 has two orientations that depend on the desired mode of operation of cursor control device 10. In the camera mode, the sensor 34 faces the environment (e.g., a meeting room), while in the cursor control mode, the sensor 34 faces a contact surface (e.g., mouse pad) or a remote surface (e.g., wall) having a reference point or other graphical pattern. However, in both modes, the sensor 34 can function in the same manner by capturing images on a frame-by-frame basis (e.g., 30 frames/sec.), and really does not need to know what mode it is operating in (unless the sensor 34 has embedded DSP functions, in which case the toggle signal must be provided to the sensor 34 to tell the processing logic embedded with the sensor 34 what type of DSP to perform). In other words, sensor 34 can continuously capture images on a frame-by-frame basis in either operation mode, and then provide these images to the PC 78 or controller 118 together with the mode signal where DSP is performed (in the manner explained below) for all the frames. The mode signal is transmitted together with the bit stream and enables either the PC 78 or controller 118 to determine the mode of operation, and how the received images are to be used (i.e., as camera video image or in cursor control). By allowing the sensor 34 to function in the same manner in both modes of operations, the operation time and hardware complexity of the cursor control device 10 can be greatly reduced. In addition, the cursor control device 10 can be made to be easily compatible with most DSP software available in the marketplace, thereby reducing the hardware complexity since only simple revisions to the DSP software drivers are needed to make the compatibility work.

Figure 3:
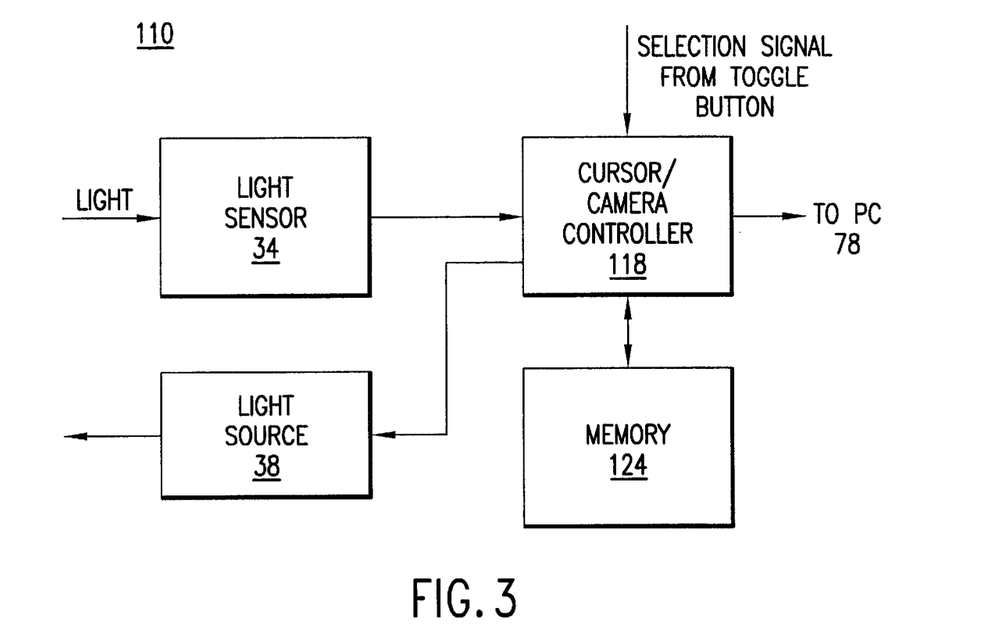
FIG. 3 illustrates a block diagram of a cursor control device configured in accordance with one embodiment of the present invention.

FIG. 3 illustrates a block diagram of the electronics 110 of cursor control device 10 configured in accordance with one embodiment of the present invention. Electronics 110 includes the light sensor 34 of FIGS. 1B and 1C that receives light and converts the light into electrical signals corresponding to the received light. An integrated cursor and camera controller 118 is coupled to light sensor 34, and depending on whether controller 118 includes a DSP module for performing digital signal processing (DSP), performs different functions. Thus, DSP can be performed either by controller 118 or by PC 78.

For example, if the controller 118 does not have a DSP module, then controller 118 essentially converts the received electrical signals into image signals 75 usable by the DSP module in the PC 78.

On the other hand, if the controller 118 includes a DSP module, then controller 118 can perform a number of DSP functions, including (among others): (1) convert the received electrical signals into image signals 75 usable by PC 78 in the camera mode, (2) convert the received electrical signals into motion information signals 105 usable by PC 78 to control the cursor in the cursor control mode, (3) image processing tasks such as color correction and image compression, (4) special functions, such as motion detection, contour enhancement, (5) calculate motion vectors when used in the cursor control mode, (6) estimate the average/group motion vector of many objects that move randomly in front of the sensor 34, and (7) perform pattern recognition. The operation of the above-described functions are triggered by the mode signal from the toggle button 18. A memory 124 is provided to store the DSP module, as well as to temporarily store either motion information signals 105 or image signals 75 before transfer of such signals to PC 78. Thus, memory 124 is provided only if the controller 118 includes a DSP module.

When DSP is performed by controller 118, a system-on-a-chip can be integrated into controller 118. An example of such a system-on-a-chip is Winbond part number W9960, an integrated circuit (IC) available from Winbond Electronics Corp., the assignee of the present invention. The W9960 has its own DSP driver so that DSP would be performed at controller 118. Thus, W9960 saves the computational power of PC 78 by having DSP performed in the cursor control device 10.

When DSP is performed by PC 78, the controller 118 can be implemented with ICs that can either be a dedicated digital signal processor or a low-cost system on a chip that carries a microprocessor (e.g., 486 series) and an embedded memory. For example, controller 118 can be implemented with Winbond part number W9967, an IC available from Winbond Electronics Corp., the assignee of the present invention. The W9967 is a fixed function DSP chip. The W9967 is a digital image signal transmission IC that is designed especially for coupling to a USB port. The W9967 is dedicated to perform simple functions, such as (i) taking digital image data from the sensor 34, (ii) performing a simple compression, and (iii) transmitting the compressed data to PC 78 for DSP. When the W9967 is utilized, the DSP module (including driver) is stored in the PC 78.

In this regard, the drivers for the W9966 and W9960 can be modified in order to perform DSP (e.g., to perform motion estimation and provide the motion estimation signals to PC 78).

In other words, for motion estimation, only changes (also referred to as delta(X) and delta(Y) or vectors) between a current frame and previous frame are important. Taking advantage of this feature, the drivers for the W9960 and W9967 can be modified to perform DSP of the received image information. As a non-limiting example, the DSP can be done in accordance to a pre-defined compression scheme, such as compression standard H.263 (commonly used for digital video conferences between PCs) or any proprietary compression scheme. Such compression schemes are well-known and will not be described in greater detail herein, except to note that they are directed to compressing the large number of bits in an image data to a smaller number of bits (often in the form of binary codes) that can be transmitted more quickly and efficiently.

In addition, since the driver for the W9967 is not provided with DSP and motion estimation capabilities, an external compression software (resident in the PC 78) can be utilized. For example, VDial is a PC-based video conferencing software that performs compression in accordance with compression standard H.263. Software such as VDial includes motion estimation threads that are used by an application software. The application software performs a converting task to transmit the corresponding motion data to the mouse driver.

The DSP performed by the present invention is not limited solely to compression or motion estimation, and can include other techniques for processing image data, especially for use in the camera mode. For example, the principles of the present invention can be used to send a triggering signal to PC 78 when the sensor 34 detects a red light having an intensity that is greater than a threshold level. A useful application for this use of a red light is when a notebook computer (such as explained in connection with FIGS. 5–9 below) is coupled to a TFT projector and is running the Powerpoint™ application to present images (such as slides) during a presentation. The speaker can point a laser pen having a bright red laser beam at the wall or screen which sensor 34 is facing. The bright red beam is received by sensor 34 and processed by the controller 118 or PC 78 to turn to the next slide in the Powerpoint™ application.

Figure 4:
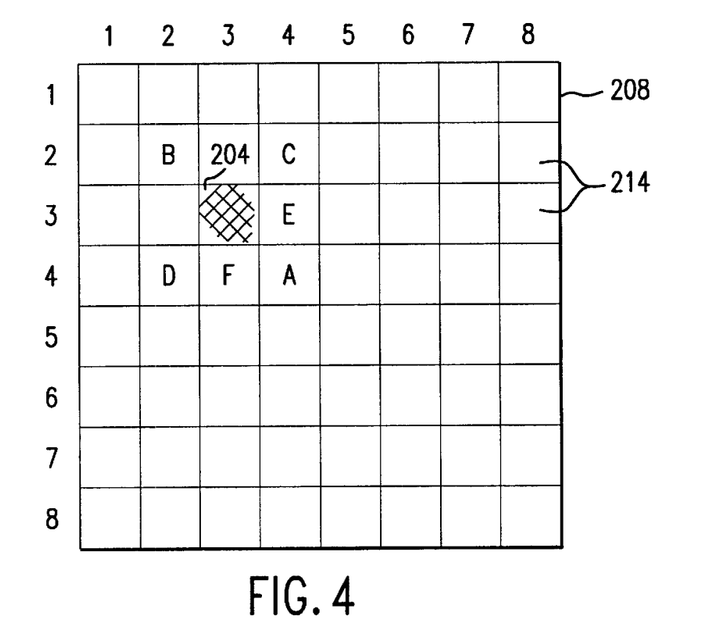
FIG. 4 illustrates an exemplary reference point in an 8×8 grid that can be used in motion estimation by the cursor control device of FIGS. 1A–1D.

Alternatively, a driver can be modified so that the driver detects and watches for the relative motion around or about a reference point (e.g., a pattern in the central vicinity of each frame) as described with reference to FIG. 4. FIG. 4 provides a non-limiting example of how motion estimation can be performed. FIG. 4 illustrates an exemplary reference point 204 in an 8×8 grid or block 208 for use in motion estimation of cursor control device. Block 208 includes a plurality of pixels 214 that are arranged in rows and columns. As noted previously, reference point 204 can be a dot or other orientation mark on the contact surface. In this example, reference point 204 is at location (3, 3) in the block 208. For motion estimation, the displacement or relative change in X and Y directions (i.e., delta(X) and delta(Y)) is determined.

The following examples provide the respective delta(X) and delta(Y) provided to PC 78 as cursor control device 10 is moved to different points (points A, B, C, D, E, and F) with respect to reference point 204. For example, as cursor control device 10 is moved to point A at location (4, 4), the detected change (i.e., delta) in X and Y position is (+1, +1). When cursor control device 10 is moved to point B at location (2, 2), the detected change in X and Y position is (−1, −1). When cursor control device 10 is moved to point C at location (4, 2), the detected change in X and Y position is (+1, −1). When cursor control device 10 is moved to point D at location (2, 4), the detected change in X and Y position is (−1, +1). When cursor control device 10 is moved to point E at location (4, 3), the detected change in X and Y position is (+1, 0). When cursor control device 10 is moved to point F at location (3, 4), the detected change in X and Y position is (0, +1). Accordingly, in the cursor control mode, the delta(X) and delta(Y) can be determined by integrated cursor and camera controller 118 and provided to PC 78.

Figure 5:
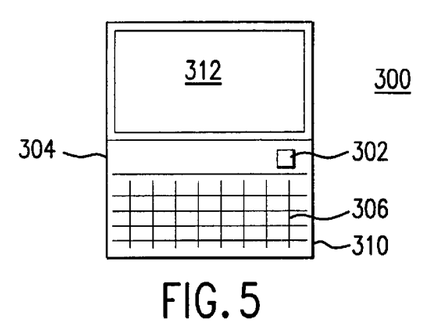
FIG. 5 is a front view of a notebook computer that utilizes a cursor control device configured in accordance with another embodiment of the present invention.
Figure 6:
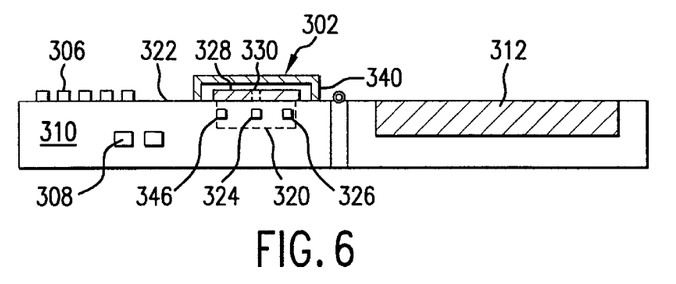
FIG. 6 is a right side view of the notebook computer of FIG. 5.
Figure 7:
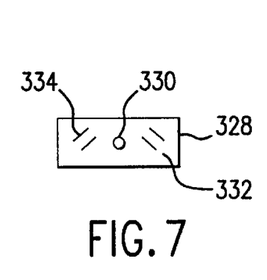
FIG. 7 is a bottom plan view of the sliding board of the cursor control device of FIG. 5.

The principles of the present invention can be extended to provide a notebook computer with an integrated cursor control device and camera. FIGS. 5 and 6 illustrate a simple notebook computer 300 that includes an integrated cursor control device and camera (also referred to as "integrated device") 302. The notebook 300 has a housing 304 that supports a keypad 306 and the integrated device 302. One or more mouse buttons 308 can be provided on a side wall 310 (or any other surface) of the housing 304. A display 312, such as a flat panel display, can be hingedly coupled to the housing 304. The remaining elements of the notebook 300 shall not described as the integrated device 302 can be implemented with any conventional notebook 300 whose principles, functions and elements are well-known by those skilled in the art.

The integrated device 302 is illustrated in greater detail in FIGS. 6–8B. A well or cavity 320 is provided in a top surface 322 of the housing 304. A sensor 324 and a light source 326 (which can be the same as, and which are intended to perform the same functions as, sensor 34 and light source 38, respectively) are provided in the cavity 320. A sliding board 328 is positioned on the top surface 322 of the housing 304 and adapted to completely cover the cavity 320. As shown in FIGS. 6 and 9, a shell 340 is permanently mounted to the top surface 322 of the housing 304 and houses or retains the sliding board 328 therewithin. The shell 340 is larger than the sliding board 328 so that the sliding board 328 can be manipulated in both the X and Y directions while retained inside the shell 340. In addition, the shell 340 has an opening 342 on its top surface 344 that can be of any shape (circular, square, rectangular, etc.) as long as (1) the opening 342 is smaller than the size of the sliding board 328 to prevent the sliding board 328 from being removed from the shell 340, and (2) the opening 342 is sufficiently large to allow the user's finger to manipulate the sliding board 328. The board 328 has a view hole 330 which extends through the thickness of the board 328. The view hole 330 can be provided anywhere on the board 328. In addition, the bottom surface 332 of the board 328 that faces the cavity 320 is provided with any pattern that forms an image 334, similar to the patterns described above, and can include grids, graded colors, marks, etc.

The sliding board 328 can be provided with a magnetic material that is used to hold the sliding board 328 at a fixed position with respect to the cavity 320 of housing 304. For example, the sliding board 328 can be made by mixing a polymer (such as PVC, polyester, PET, among others) with a magnetic powder (such as ferrite magnetic powder) and then hot pressing through the use of a mold. The polymer is solidified after the injection process. The presence of the magnetic powder causes the resulting sliding board 328 to act like a magnet piece. In addition, an opposing magnet piece 346 can be positioned on a side wall of cavity 320 at a position that is slightly offset from the top of the cavity 320. Thus, the magnetic sliding board 328 will be attracted to the magnet piece 346 to hold the board 328 at a desired positioned with respect to the cavity 320. The magnet piece 346 is vertically offset from the board 328 to minimize undesirable friction.

Figure 10:
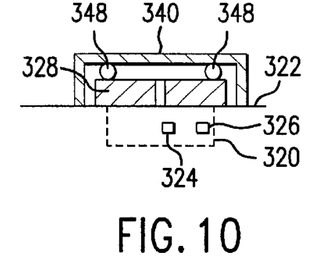
FIG. 10 illustrates an alternative embodiment for retaining the sliding board inside the shell.

Instead of using magnetic forces to hold the board 328 in a desired position with respect to the cavity 320, it is possible to provide a plurality of bearings 348 in the space between the board 328 and the shell 340 (see FIG. 10). The bearings 348 hold the board 328 firmly against the top surface 322, but yet allows a small force to be able to slide the board 328 with respect to the top surface 322. In the embodiment of FIG. 10, the magnet piece 346 can also be omitted.

The integrated device 302 can be used in both the cursor control mode and the camera mode. When used in the camera mode, view hole 330 is aligned with sensor 324 (see FIG. 8A) so that the image can be received by sensor 324 via the view hole 330. The magnetic nature of the board 328 helps to retain the sliding board 328 at the aligned position against the cavity 320. Of course, the notebook 300 needs to be positioned so that the line-of-sight of sensor 324 faces the intended image.

Figure 8A:
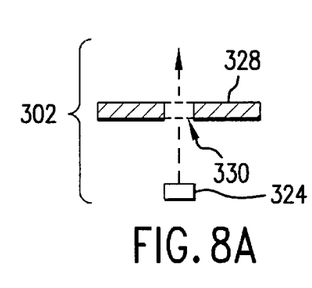
FIGS. 8A and 8B illustrate the operation of the cursor control device of FIG. 5.
Figure 8B:
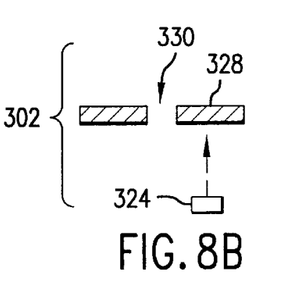
Figure 9:
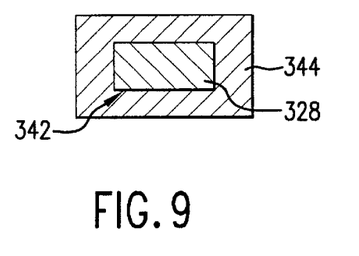
FIG. 9 is an expanded top view of the shell used to retain the sliding board of FIG. 7.

When used in the cursor control mode, the user merely slides the board 328 to overcome the magnetic attraction between board 328 and magnet piece 346, so that the line-of-sight of sensor 324 is not aligned with the view hole 330 (i.e., blocked by the board 328) (see FIG. 8B). This will cause sensor 324 to detect the changing images of the image 334 on the bottom surface 332 of the board 328 as the user moves the board 328, with illumination being provided by the light source 326. The magnetic attraction between board 328 and magnet piece 346 is preferably such that it can be overcome by a small force, so that the user can easily manipulate the sliding board 328 in the X and Y directions when in the cursor control mode. One of the mouse buttons 308, or a laser pointer, or one of the keys on the keypad 306, can be used to provide the toggle signal.

The operation of the notebook 300 in processing the received image signals can utilize the same principles set forth above. The electronics 110 of FIG. 3 can be used in the same manner described above with Winbond part number W9960 used as controller.118 in this application. The DSP and motion estimation principles described above can also be applied to this application. Since the notebook system 300 will have its own memory, the memory 124 can be omitted. In addition, W9967 cannot be used with the notebook system 300.

Although certain components, subsystems, and blocks have been described above as including certain elements, it will be appreciated by those skilled in the art that such disclosures are non-limiting, and that different elements, or combinations thereof, can be provided for such components, subsystems, and blocks without departing from the spirit and scope of the present invention. For example, if sensor 34 has embedded DSP capabilities, then the controller 118 and the PC 78 do not need to perform the necessary DSP. As another example, the red laser beam of a laser pointer can be used (in the manner above with respect to the bright red light) to trigger or generate the toggle signal instead of the user-selectable button.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims. For example, if the cursor control device 10 of the present invention is intended for use only as a cursor control device, and not as a video camera, then it is possible to use low-quality CMOS or CCD sensors 34 that would normally be discarded by manufacturers. Specifically, high resolution CCD or CMOS sensors are required if the sensor is to be used to capture camera or video images. However, if the sensor is only intended to detect changing images for use in cursor control, then low resolution CCD or CMOS sensors can be used since an optical cursor control device using motion estimation does not require such high resolutions. This is because motion estimation is performed based on a number of pixel blocks. This means that the sensor only needs to provide a picture that is composed of a sufficient number of blocks to perform motion estimation, so that the resolution of the sensor is not critical. Thus, this would create an efficient alternative use for potential waste products.

What is claimed is:

1. An apparatus for capturing images and for manipulating a cursor, said apparatus capable of being used in a first mode and a second mode, said apparatus comprising:
    an opto-electronic mechanism for capturing images;
    a user-selectable trigger for allowing a user to determine if operation is in the first mode or the second mode and for providing a mode signal;
    a controller coupled to the opto-electronic mechanism and user-selectable trigger for receiving the mode signal and when in the first mode for translating the captured signals into corresponding motion information signals used to control the cursor, and when in the second mode for capturing and displaying the images; and
    a cursor movement module for receiving the captured images and using image comparison to selectively provide cursor position signals based on the image comparison.

2. The apparatus of claim 1 further comprising an image capture module coupled to the controller for controlling the opto-electronic mechanism and managing the image capture.

3. The apparatus of claim 1 wherein the opto-electronic mechanism includes a charge-coupled device (CCD) sensor.

4. The apparatus of claim 1 wherein the opto-electronic mechanism includes a CMOS sensor.

5. The apparatus of claim 1 further comprising a memory coupled to the controller for storing the captured images and the motion information signals.

6. The apparatus of claim 1 wherein the controller further includes a DSP module.

7. The apparatus of claim 6 wherein the DSP module further includes a compression module for compressing the captured images.

8. The apparatus of claim 1, wherein the controller is a separate PC that is coupled to the apparatus.

9. The apparatus of claim 1, wherein the apparatus includes a bottom surface, and a chamber provided in the bottom surface, and wherein the opto-electronic mechanism is provided in the chamber.

10. The apparatus of claim 9, further comprising a light source provided in the chamber for providing illumination.

11. The apparatus of claim 9, wherein the apparatus includes a side surface adjacent to the bottom surface, and wherein the apparatus is supported on the side surface to facilitate image capture by the opto-electronic mechanism.

12. The apparatus of claim 1, wherein the user-selectable trigger is a laser beam.

13. A method of using images to provide mouse position signals, comprising the steps of:
   a. receiving a first image;
   b. receiving a second image after receipt of the first image; and
   c. comparing the first and second images and selectively modifying the mouse position signals based on the comparison.

14. In an apparatus for capturing images and for manipulating a cursor, said apparatus having a first mode and a second mode, a method of providing position information signals or images comprising:
   a. receiving a modes signal that indicates desired operation in either a first mode or a second mode;
   b. receiving image signals;
   c. if the first mode is selected, controlling cursor movement based on the received image signals; and
   d. if the second mode is selected, processing and displaying image signals;
      wherein controlling cursor movement and processing and displaying image signals includes motion estimation.

15. The method of claim 14 wherein controlling cursor movement is done by determining position signals based on the received image signals.

16. A notebook computer having an apparatus for capturing images and for manipulating a cursor, said apparatus capable of being used in a first mode and a second mode, said apparatus comprising:
   an opto-electronic mechanism for capturing images;
   a user-selectable trigger for allowing a user to determine if operation is in the first mode or the second mode and for providing a mode signal; and
   a controller coupled to the opto-electronic mechanism and user-selectable trigger for receiving the mode signal and when in the first mode for translating the captured signals into corresponding motion information signals used to control the cursor, and when in the second mode for capturing and displaying the images.

17. A notebook computer having an apparatus for capturing images and for manipulating a cursor, said apparatus capable of being used in a first mode and a second mode, said apparatus comprising:
   an opto-electronic mechanism for capturing images;
   a user-selectable trigger for allowing a user to determine if operation is in the first mode or the second mode and for providing a mode signal;
   a controller coupled to the opto-electronic mechanism and user-selectable trigger for receiving the mode signal and when in the first mode for translating the captured signals into corresponding motion information signals used to control the cursor, and when in the second mode for capturing and displaying the images; and
   a sliding board having a view hole, with the sliding board covering the opto-electronic mechanism when in the first mode and with the view hole aligned with the opto-electronic mechanism when in the second mode.

18. The computer of claim 17, wherein the board has a bottom surface facing the opto-electronic mechanism, the bottom surface having an image provided thereon.

19. The computer of claim 17, wherein the apparatus further includes a light source provided adjacent the opto-electronic mechanism for providing illumination.

20. The computer of claim 17, further including a surface having a cavity, with the opto-electronic mechanism and light source provided in the cavity, and with the board covering the cavity.

21. A notebook computer having an apparatus for capturing images and for manipulating a cursor, said apparatus capable of being used in a first mode and a second mode, said apparatus comprising:
   an opto-electronic mechanism for capturing images;
   a user-selectable trigger for allowing a user to determine if operation is in the first mode or the second mode and for providing a mode signal; and
   a controller coupled to the opto-electronic mechanism and user-selectable trigger for receiving the mode-signal and when in the first mode for translating the captured signals into corresponding motion information signals used to control the cursor, and when in the second mode for capturing and displaying the images, wherein the controller further includes a DSP module.

22. The computer of claim 21 wherein the DSP module further includes a compression module for compressing the captured images.

* * * * *